(12) United States Patent
Watkins et al.

(10) Patent No.: US 10,078,543 B2
(45) Date of Patent: Sep. 18, 2018

(54) CORRECTABLE ERROR FILTERING FOR INPUT/OUTPUT SUBSYSTEM

(71) Applicant: Oracle International Corporation, Redwood City, CA (US)

(72) Inventors: John E. Watkins, Sunnyvale, CA (US); Joseph R. Wright, Round Rock, TX (US); John R. Feehrer, Westford, MA (US)

(73) Assignee: Oracle International Corporation, Redwood City, CA (US)

( * ) Notice: Subject to any disclaimer, the term of this patent is extended or adjusted under 35 U.S.C. 154(b) by 99 days.

(21) Appl. No.: 15/167,601

(22) Filed: May 27, 2016

(65) Prior Publication Data

US 2017/0344419 A1 Nov. 30, 2017

(51) Int. Cl.
*G06F 11/00* (2006.01)
*G06F 11/07* (2006.01)

(52) U.S. Cl.
CPC ........ *G06F 11/0781* (2013.01); *G06F 11/076* (2013.01)

(58) Field of Classification Search
CPC ............... G06F 11/0781; G06F 11/079; G06F 11/0709; G06F 11/0766; G06F 11/0772; G06F 11/076; G06F 11/0751
See application file for complete search history.

(56) References Cited

U.S. PATENT DOCUMENTS

| | | | |
|---|---|---|---|
| 2006/0271718 A1* | 11/2006 | DiPlacido, Jr. ..... | G06F 11/0745 710/263 |
| 2007/0260796 A1 | 11/2007 | Grossman et al. | |
| 2008/0244146 A1* | 10/2008 | Das ..................... | G06F 11/0745 710/309 |
| 2013/0013868 A1 | 1/2013 | Allen et al. | |
| 2013/0060981 A1 | 3/2013 | Horn et al. | |
| 2013/0173837 A1 | 7/2013 | Glaser et al. | |
| 2013/0185517 A1 | 7/2013 | Elboim et al. | |
| 2014/0237156 A1 | 8/2014 | Regula et al. | |
| 2014/0359267 A1 | 12/2014 | Moriki et al. | |
| 2014/0372426 A1* | 12/2014 | Garcia ............... | H03K 19/1776 707/736 |

(Continued)

*Primary Examiner* — Joseph D Manoskey
(74) *Attorney, Agent, or Firm* — Robert C. Kowert; Meyertons, Hood, Kivlin, Kowert & Goetzel, P.C.

(57) ABSTRACT

A switched fabric hierarchy (e.g., a PCIe hierarchy) may utilize hardware, firmware, and/or software for filtering duplicative or otherwise undesirable correctable error messages from reaching a root complex. An operating system of the root complex may detect a persistent stream or storm of correctable errors from a particular endpoint and activate filtering of correctable errors from that endpoint. A filtering device may receive filtering commands and parameters from the operating system, implement the filtering, and monitor further correctable errors from the offending device. While an offending device is being filtered, correctable error messages from the offending device may be masked from the operating system, while correctable error messages from other devices in the switched fabric hierarchy may be transmitted. At such time as the filtering device may detect that conditions for ending filtering of a device are met, the filtering device may cease filtering of the offending device and return monitoring responsibilities to the operating system.

20 Claims, 6 Drawing Sheets

(56) References Cited

U.S. PATENT DOCUMENTS

| | | |
|---|---|---|
| 2015/0201034 A1 | 7/2015 | Hellyar et al. |
| 2015/0220409 A1 | 8/2015 | Shao et al. |
| 2017/0091013 A1* | 3/2017 | Tallam, Sr. ......... G06F 11/0772 |

* cited by examiner

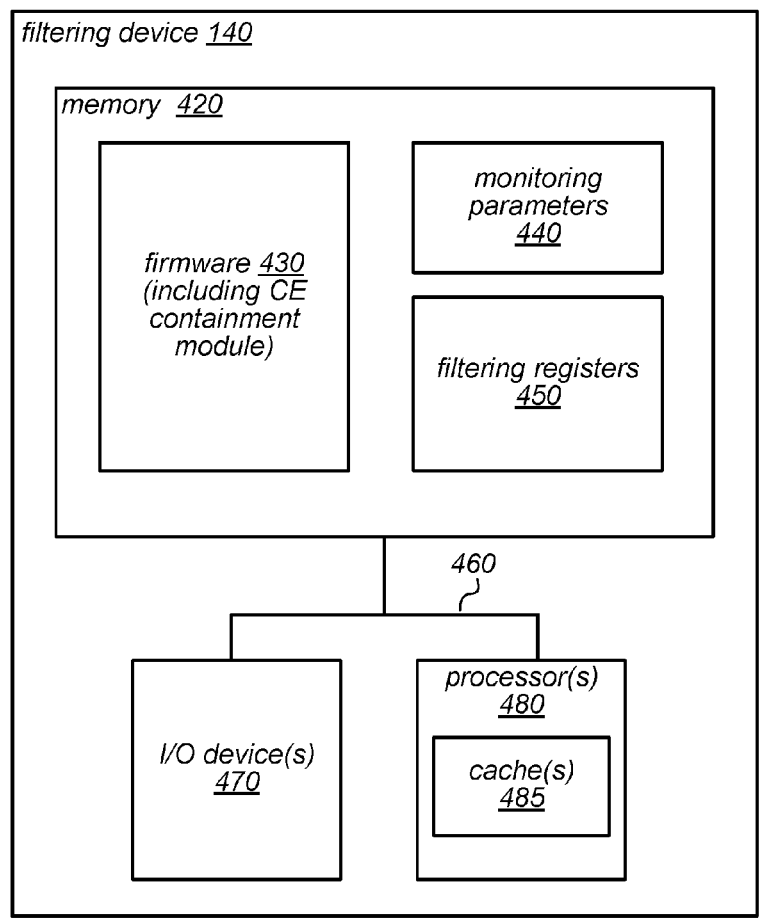

FIG. 4A

| Bit Range | Field Name | Access | Reset | Description |
|---|---|---|---|---|
| [15:00] | RID Filter | RW | 0 | CE containment writes into this register the RID of the device whose messages are to be filtered. CE messages from this RID will not be transmitted to the root complex OS (and/or written to the ring FIFO logic). |
| [16] | RID Filter Start | RW | 0 | Setting this bit starts RID filtering. A separated RID Filter Catch bit is set if a message from the device whose RID is in the "RID Filter" field arrives while the "RID Filter Start" bit is set. Clearing "RID Filter Start" disables filtering. |

FIG. 4B

CORRECTABLE ERROR FILTERING FOR INPUT/OUTPUT SUBSYSTEM

BACKGROUND

Technical Field

This disclosure relates to computing systems, and more particularly, to techniques for implementing filtering of correctable error ("CE") messages for input/output ("I/O") subsystems within a switched fabric hierarchy.

Description of the Related Art

Computer systems may include multiple processors or nodes, each of which may include multiple processing cores. Such systems may also include various input/output (I/O) devices, which each processor may send data to or receive data from. For example, I/O devices may include network interface cards (NICs) or network adapters that allow the processors to communicate with other computer systems, and external peripherals such as printers. In some systems, such I/O devices may send interrupts to signal various events. For example, an I/O device may send an interrupt to signal the completion of a direct memory access (DMA) operation or another type of operation. An I/O device may send a message to inform software of an internally detected error, or of an error on an I/O link coupled to the I/O device.

System I/O architectures such as PCI Express (PCIe) have become extremely successful and adopted throughout the computer industry. Within a typical PCIe hierarchy, one node is designated as the root complex within the fabric and is responsible for resource allocation for itself and for all other fabric nodes (e.g., various switches and endpoint devices). PCIe message packets, in most systems, form a small fraction of the overall transaction layer packet (TLP) traffic. These systems are typically set up to handle large quantities of regular communication packets (e.g., standard communications in the form of posted transaction packets, non-posted transaction packets, and completion packets), but not for handling large quantities of error messages or other exception-related messages.

SUMMARY

Various embodiments of a system, an apparatus, and methods for implementing correctable error filtering for input/output subsystems within a switched fabric hierarchy are described herein. In some embodiments, the system may include a switched fabric hierarchy (e.g., a PCIe hierarchy) with a single root complex component and multiple endpoint devices.

As described in more detail herein, a switched fabric hierarchy (e.g., a PCIe hierarchy) according to some embodiments may use on-chip hardware in a PCIe device to filter correctable errors for an input/output (I/O) subsystem. For example, an operating system of a root complex may detect a large number of repeated or related errors from an endpoint within the switched fabric hierarchy. In response to this detection, the root complex may instruct a filtering device to mask further CE messages from that endpoint while allowing messages from other endpoints to pass through as normal. The filtering device may determine, using various parameters, when to cease filtering and restore normal CE message monitoring to the root complex operating system.

BRIEF DESCRIPTION OF THE DRAWINGS

FIG. 4A is a block diagram illustrating one embodiment of an error message filtering device.

FIG. 4B is a table representing a filter register according to some embodiments.

Figure 1:
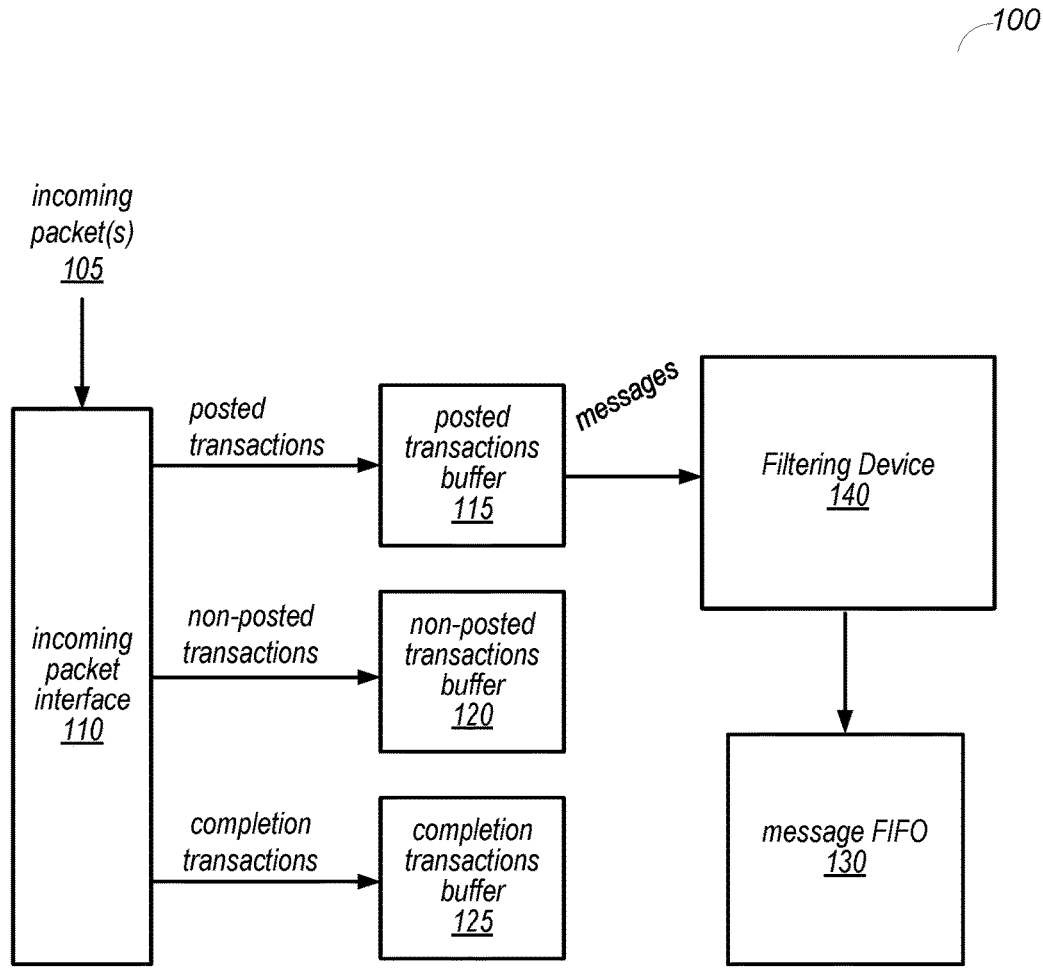
FIG. 1 is a data flow diagram illustrating how some incoming packets are handled in a switched fabric hierarchy including an error message filtering device, according to at least some embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

As described in more detail herein, a switched fabric hierarchy (e.g., a PCIe hierarchy) may use on-chip hardware in a PCIe device to filter correctable errors for an input/output (I/O) subsystem. For example, an operating system of a root complex may detect a large stream of correctable errors (sometimes referred to as a correctable error storm) from an endpoint within the switched fabric hierarchy. In response to this detection, the root complex may instruct a filtering device to mask further CE messages from that endpoint. The filtering device may determine, using various parameters, when to cease filtering and restore normal CE message monitoring to the root complex operating system.

In some embodiments of the systems described herein, when certain types of errors take place (including, e.g., errors that take place between the root complex and endpoint traffic flows), they may be sent to the root complex to be handled. For example, the error may be associated with a switch through which traffic going between the root complex and the endpoint passes. In some cases, errors associated with these traffic flows may be handled by the root complex, in which case the root complex may have to examine registers inside the endpoint devices in order to make the appropriate decisions to keep the maximum number of nodes up and running and/or to perform any sort of required clearing of errors (e.g., in a restoration of process).

In some embodiments, there may be different classifications of errors. For some classes of errors, when an error is encountered, an affected endpoint may become aware of some of the error directly and may be able to attempt a retry or otherwise attempt to handle the error. However, in some embodiments, all error handling may go through the root complex. In such embodiments, even though an error may have involved a flow between two endpoint devices or between a particular endpoint and a shared I/O device, the root complex may act as a third party that is involved in the handling of that error. In some embodiments, these systems may take advantage of Advanced Error Reporting (as defined by the PCIe specification) and special error messaging in order to handle errors. For example, when an error is encountered, one of the affected endpoint devices may send out a special type of packet as an error message packet, and these types of messages may only be able to flow from the endpoint device up to the root complex.

As previously noted, PCIe message packets (which are distinct from normal communication traffic packets such as those representing memory reads, memory writes, etc., and have a different purpose) may, in most systems, form a small fraction of overall transaction layer packet traffic. In some systems, the predominant use of PCIe message packets is in error reporting to the root complex. However, under certain error or exception conditions, a large number of these messages may be generated within a short period of time. These message packets (which are posted writes) are defined as part of the PCIe specification, and include a different header definition than that of normal communication traffic packets. For example, the fields inside of the header include different encodings and the packet format is different.

A typical PCIe hierarchy in a distributed system may include a root complex and a small number of endpoint devices (e.g., a disk controller, a network interface, and/or other endpoint devices). In such a system, the root complex may be responsible for fielding and handling errors, performing maintenance tasks on behalf of the PCIe hierarchy, and, in most cases, performing portions of a mission-mode application that is executing in the system. If any endpoint detects errors with the links, it may report these errors to the root complex for handling.

Typically, the root complex includes a special handler for these types of messages, but there is only a very limited capacity to queue up and process these types of messages. Therefore, in a large, high-performant system, it may be easy to overrun the capacity of the root complex to handle the messages it receives. In other words, when a PCIe root complex is in a PCIe hierarchy containing many endpoints and the system demands high RAS (Reliability, Availability, and Serviceability) attributes of that hierarchy, standard PCIe error message logging facilities may not be able to capture information (e.g., the identifiers) of multiple messages that are received from different endpoints concurrently. The error framework software may, consequently, have less timely error reporting information from the hierarchy with which to make decisions and to take corrective actions (e.g., actions that may be needed to keep members of the hierarchy operating or to transfer information from a node with degraded behavior to another location before it degrades to a non-accessible state). The techniques described herein may allow the root complex to filter correctable error messages for an input/output (I/O) subsystem, in certain circumstances, to avoid being overrun with messages that provide little to no additional information.

In some embodiments, incoming messages may be classified at multiple points prior to being processed. For example, in some embodiments, hardware within the recipient node (e.g., the root complex or an endpoint device) may intercept incoming packets and may determine that an incoming packet (one that is a posted write) is actually a message, rather than another type of transaction, and may store the message temporarily (e.g., in a small FIFO or other small data structure in local memory on the recipient node). The hardware may then analyze each message to classify it as to its type. For example, under the PCIe specification, there are three types of error messages: messages representing correctable errors, messages representing fatal non-correctable errors, and messages representing non-fatal, non-correctable errors. These messages are typically received by the node acting as the root complex from endpoint devices (or other system components).

In some embodiments, some or all of the hardware described herein for filtering CE messages may reside on a processor chip of a node in a switched fabric hierarchy. This processor chip may include hardware dedicated to the PCIe interface, which may include respective buffers for packets of different traffic types (e.g., posted transactions, non-posted transactions, and completion packets), and may include separate buffers for packet headers and data for each traffic type, as described in the PCIe specification. In addition, the processor chip may, in the systems described herein, include a small FIFO RAM structure into which messages are placed (after being classified as messages). Note, however, that flow control credits for each message may be returned by the node once information about the corresponding posted write transaction is placed in the PCIe buffer for posted writes (i.e., prior to the packet being classified as a message or as a message of a particular type). Note also that information about memory posted writes (which are distinct from messages) is not placed in the message FIFO.

FIG. 1 is a data flow diagram of a system 100 illustrating how some incoming packets may be handled on a node in a switched fabric hierarchy including an error message filtering device, according to at least some embodiments. In some embodiments, the node may act as a root complex component in a switched fabric hierarchy (e.g., a PCIe hierarchy). In other embodiments, the node may act as an endpoint device in a switched fabric hierarchy (e.g., a PCIe hierarchy). In this example, incoming packets 105 may be received by an incoming packet interface component 110 of the node. These incoming packets 105 may include packets of a variety of different types, each of which may be handled differently by the node. For example, one subset of the incoming packets may represent posted transactions, and these packets may be routed to a posted transactions buffer 115 on the node for initial processing. Another subset of the incoming packets may represent non-posted transactions, and these packets may be routed to a non-posted transactions buffer 120 on the node for initial processing. Yet another subset of the incoming packets may represent completion transactions, and these packets may be routed to a completion transactions buffer 125 on the node for initial processing. In some embodiments, once an incoming packet has been routed to one of posted transactions buffer 115, non-posted transactions buffer 120, or completion transactions buffer 125, appropriate flow control credits may be returned (e.g., without waiting for the packet to be fully processed).

In some embodiments, messages from a posted transactions buffer 115 may pass to a filtering device 140. In various embodiments, certain types of messages may be filtered out at filtering device 140 before being passed further in the PCIe architecture. For example, in some embodiments, filtering device 140 may prevent transmission of all or some of the correctable error messages from a particular node or device within a switched fabric hierarchy. In some example systems, a filtering device 140 may operate as a standalone piece of hardware, including a processor, memory, firmware, and hardware registers. In some embodiments, a filtering device 140 may be implemented partially or completely within a root complex or endpoint node of a switched fabric hierarchy.

As described herein, some PCIe transactions may represent messages (which, according to the PCIe standard, are particular types of posted writes). In some embodiments, such packets may be stored in a message FIFO 130 prior to any further processing. The message contained in each of the packets may then be examined to determine the type of the message, and different messages may be written out to various locations depending on message type. Depending on which node receives the message (e.g., the root complex or an endpoint device), the messages may include error messages of various types, non-error messages of various types (including, but not limited to vendor-defined messages), or some other subset(s) of received messages that are buffered for subsequent processing.

A typical PCIe system architecture may support electrical channels to different nodes within a single system that have substantial differences in channel length, topology, or a number of other factors that result in some channels being more electrically demanding than others to achieve a given bit error rate. Additionally, various types of nodes or devices within a system have different failure rates, causes, and patterns. Responding to numerous errors and warnings within a system can degrade system performance. Meeting all conditions at all times in a large system can dictate a very difficult and costly design and validation process.

A PCIe or similar protocol may implement cyclic redundancy checking ("CRC") and report a correctable error when a received packet fails this check. In some systems, an endpoint in a hierarchy may intermittently issue a large stream of correctable errors, each of which must be served by the operating system in the root complex in a typical architecture. This phenomenon, often referred to as a CE storm, can be caused by a variety of reasons and may lead to error management software in the root complex being repeatedly called to service an error the endpoint has already corrected, or an error which can be prioritized below other functions in the system. By implementing an error message filtering device or software, redundant, unnecessary, irrelevant, or low-priority messages may be masked from the operating system, saving system resources and potentially increasing tolerance for system design and testing, thus reducing costs.

One of ordinary skill in the art will appreciate that several particular configurations of a PCIe or other switched fabric system may be suitable for application of the methods and systems described herein for filtering CE messages. For example, various known PCIe message reception and processing configurations may be compatible, such as a queue, simple register, a ring controller (e.g. a system which may characterize and/or prioritize incoming messages and store them in various ring buffers for handling according to message type), or various other structures.

Figure 2:
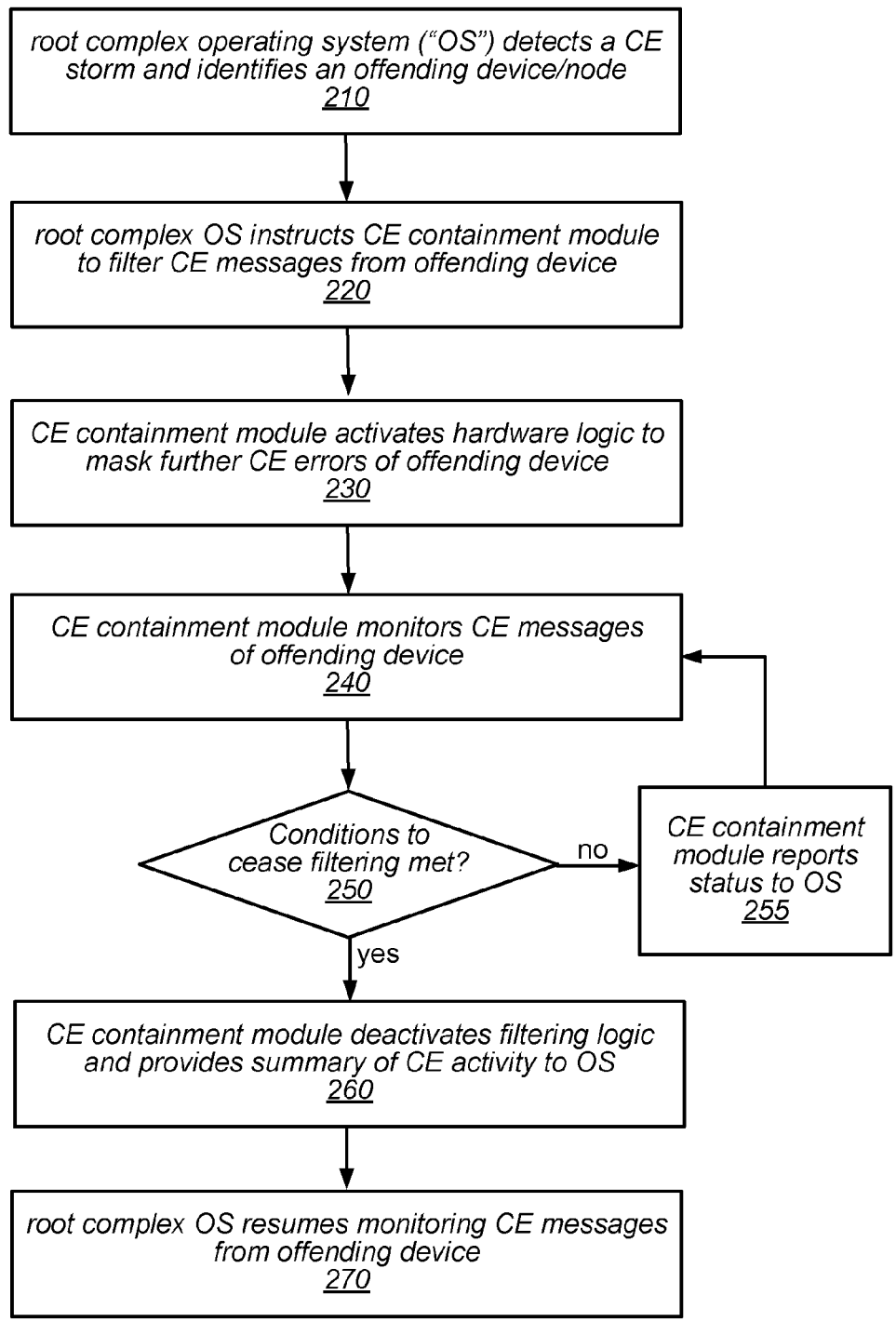
FIG. 2 is a flow diagram illustrating one embodiment of a method for filtering correctable error messages in a switched fabric hierarchy (such as a PCIe hierarchy).

FIG. 2 is a flow diagram illustrating one embodiment of a method for filtering correctable error messages in a switched fabric hierarchy, such as a PCIe hierarchy, according to at least some embodiments. At step 210 of process 200, an operating system ("OS") of the root complex detects a CE storm and identifies an offending device or node that is causing the CE storm. For example, the detection may be triggered by the operating system receiving a predetermined number of redundant and/or low-priority errors from the same device over a period of time. These thresholds may be set by system designers and updated periodically.

In some embodiments, an operating system may store or otherwise have access to stored error and/or failure profiles of various types of endpoint devices, which may define or help the operating system to determine conditions for identifying a device as an offending device requiring error filtering. Such stored profiles may be updated periodically by system designers or administrators, received from other devices, or partially or wholly created and edited by the root complex itself in response to past data and observed conditions, including device failure conditions. In some embodiments, such stored profiles may be implemented in a look-up table or similar structure, stored remotely or within a memory of the root complex.

At step 220, the root complex OS instructs a CE containment module or layer to filter CE messages from the identified offending device. In some embodiments, the OS may pass any or all of: an RID of the offending device, instructions on how often the containment layer should query CE events from the device, various other control handling thresholds or limits (e.g. correctable error count and/or timing thresholds defining when error filtering should be deactivated), and a command to activate error message filtering on the offending device. In some embodiments, the CE containment module may be implemented as firmware within filtering device 140. In other systems, the CE containment module or layer may be implemented at the root complex, for example by a spare or underutilized processor separate from the primary operating system processor, or, for example, a dedicated ARM processor. In some embodiments, the CE containment layer/module may be executed on a spare CPU thread of the root complex or a separate filtering device, an embedded management processor, or an embedded maintenance processor. In still other embodiments, the CE containment module may be implemented wholly or partially within an endpoint node or device. The CE containment module is described in detail herein with reference to FIG. 4.

At step 230 of process 200, the CE containment module activates hardware logic to mask further CE messages from the offending device from reaching the root complex, while allowing other types of messages from the offending device and any messages from other devices or endpoints to pass through the system as normal. For example, in some embodiments, CE messages from the offending device will be dropped at the filtering device before they can reach the message-handling FIFO logic. In some systems, the CE containment module may directly activate hardware-level filtering, for example by setting or manipulating hardware registers to drop CE messages from the offending device. Alternatively or in combination, CE containment module may communicate filtering instructions to a hardware controller which then directly implements hardware-level CE message filtering. These functions and hardware are further described herein with reference to FIGS. 4A and 4B.

At step 240, the CE containment module monitors CE messages of the offending device and applies any parameters supplied by the operating system of the root complex. In an example system, the CE containment module may determine (or receive from the OS) a number of desired queries of CE errors of the offending device. The CE containment module may further determine a frequency of queries and/or period of time for monitoring. These parameters may, e.g., be supplied to the CE containment module by the OS, calculated by the CE containment module, or read from one or more stored profiles pertaining, e.g., to the specific offending device, devices of the same or similar type as the offending device, or the particular switched fabric system. In some embodiments, a CE message event counter may be incremented each time a query determines that the offending device has generated a CE message since the previous query.

When the CE containment module has made the desired number of queries, the CE containment module determines at 250 whether conditions to cease filtering have been met. For example, the OS may have passed to the CE containment module a CE message event threshold value. In some embodiments, if the value of the CE message event counter is less than the CE message event threshold value, the CE containment module may deactivate hardware-level filtering at step 260 (for example, by reversing its activation procedure or instructing a hardware controller to stop filtering). In some embodiments, if the value of the CE message event counter is equal to or greater than the specified threshold, monitoring may be continued for a period of time, and/or the query counts may be reset and the querying process restarted. Additionally, a report or summary of CE message activity (e.g. a simple count or a more complex report) may be sent to the OS (step 255). In some embodiments, a similar report may be generated and transmitted as part of step 260. The monitoring functions of the CE containment module are further described herein with reference to FIG. 5.

At step 270, the root complex resumes monitoring CE messages from the offending device. In some embodiments, this step may represent a reversion to a standard operating mode. In other embodiments, the root complex may handle messages from the previously offending device differently than other devices in the system. For example, the root complex OS may lower its tolerance (e.g. threshold) for duplicative errors from a previously offending device so as to reduce potential waste of resources for devices known to have previously generated an error storm.

Illustrative PCIe Hierarchy

Figure 3:
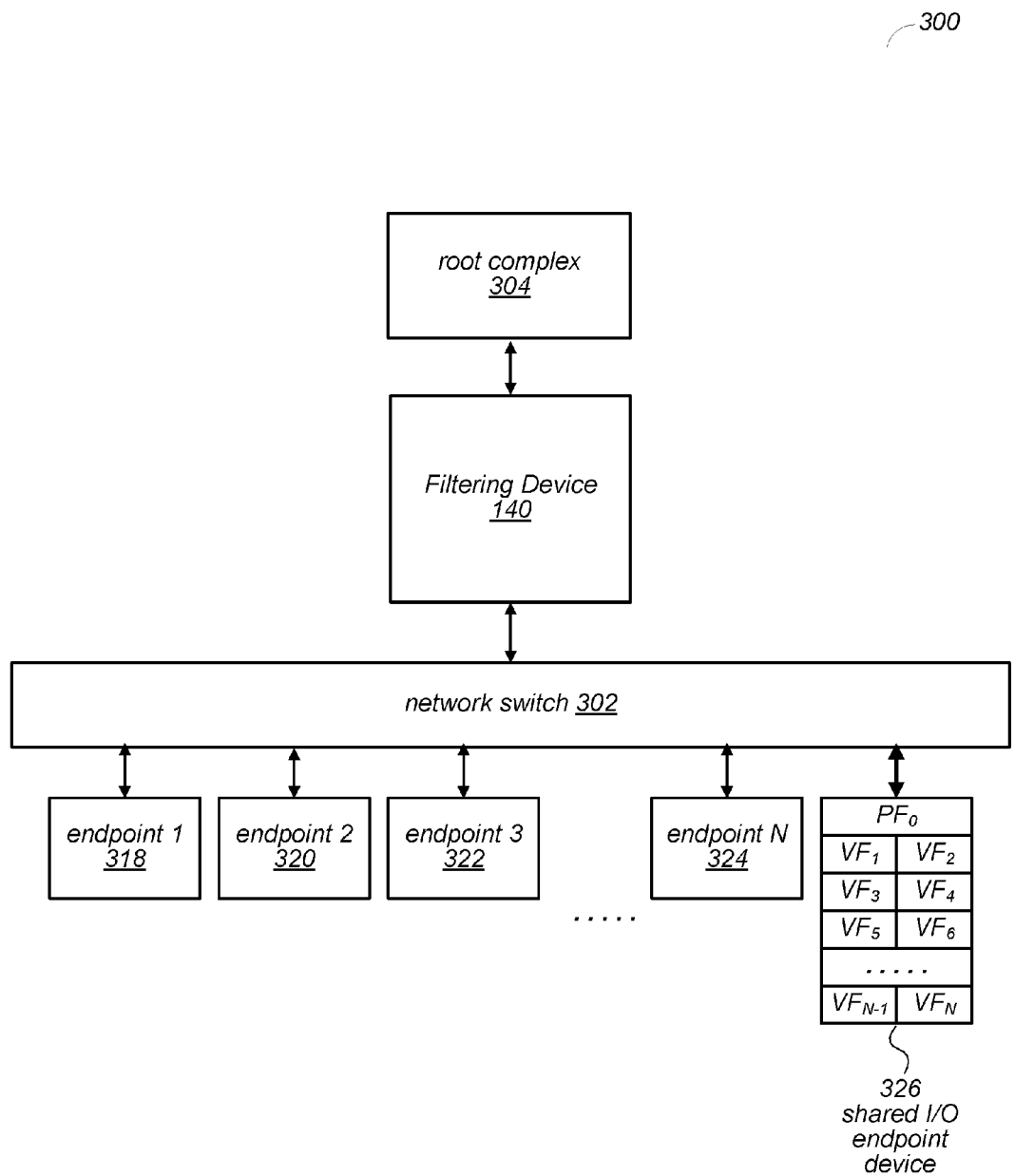
FIG. 3 is a block diagram illustrating one embodiment of a PCIe hierarchy that includes a single root complex and multiple endpoint devices.

A typical PCI Express (PCIe) hierarchy suitable to implement some embodiments of the disclosed inventions may include a single root complex (RC), multiple endpoint devices (EPs), and a PCIe switch. One embodiment of such a PCIe hierarchy (a hierarchy to which the techniques described herein may be applicable) is illustrated by the block diagram of system 300 in FIG. 3. In this example, various ones of the endpoint devices may be processing nodes, I/O devices, peripheral devices, or other types of nodes in the PCIe hierarchy. In this example, one of the endpoint devices (shown as shared I/O endpoint device 326) is a shared I/O device that is compliant with the PCISIG Single Root I/O Virtualization (SR-IOV) specification. In this example, the shared I/O endpoint device includes one physical function (PF) and N virtual functions (VFs). In this example, the PCIe hierarchy also includes multiple other endpoint devices (shown as endpoints 318-324), a network switch 302, and a node 304 that is configured as the root complex for the hierarchy. In this example, root complex 304 may include a device driver for the PF of the shared I/O device 326, and may also include a respective device driver for each of the VFs of the shared I/O device (not shown). In some embodiments, a filtering device 140 similar to that described herein may reside between network switch 302 and root complex 304. In other embodiments, the functions of filtering device 140 may be implemented within the root complex, at one or more endpoints, or a combination. In this example, each endpoint device may also include a root complex communication driver (not shown). Note that, in other embodiments, a PCIe hierarchy may include more, fewer, and/or different types of components. For example, a PCIe hierarchy in which the techniques described herein may be implemented may include more or fewer endpoint devices (or one or more types) than are depicted in FIG. 3, and may or may not include a shared I/O device.

In some embodiments, the operating system (via the root complex) may perform a discovery and initialization process in which the hierarchy is discovered, bus numbers are established, and a PCIe address map is created that allocates memory space for various resources needed by various ones of the endpoint devices. In some embodiments, communication traffic may be sent directly between endpoint devices. However, in the typical PCIe hierarchy, data and interrupt traffic flow may take place between the endpoint devices and the root complex. In some embodiments, in addition to the traditional north-south DMA traffic that goes between an endpoint and a root complex, peer-to-peer traffic from endpoint-to-endpoint may be supported in the PCIe hierarchy. For example, in some embodiments, the system may support peer-to-peer traffic between a particular endpoint (one of endpoints 318-324) and the shared I/O device 326, or between two of the endpoint nodes.

In some embodiments of the systems described herein there may be n processing nodes within a hierarchy that are physically separate, but that collectively implement a large and/or distributed application. In other embodiments, the nodes within the hierarchy may perform operations independently of each other on behalf of one or more executing applications. Note that while the techniques described herein are presented in the context of a single root hierarchy, in other embodiments they may also be applicable in other contents.

As noted above, the root complex may include a device driver for each endpoint device, which may facilitate communication between the root complex (e.g., for use in initialization and setup operations and/or for use in exception handling, in some cases).

Note that, in some embodiments of the systems described herein, each endpoint on the fabric (e.g., each endpoint on the PCIe fabric) is associated with an identifier (e.g., a routing identifier, or RID). In some such embodiments, for configuration cycles and/or other traffic that runs only run north and south between each endpoint and the root complex, the fabric switch may route traffic based on those identifiers. However, another addressing model that routes traffic based on PCI addresses may be used with communication traffic that can flow from endpoint-to-endpoint in a peer fashion, as well as from the root complex to a particular endpoint. In some embodiments, there may be multiple decoders of different decoder types within each PCI-to-PCI bridge that are set up (e.g., by the operating system running on the root complex) during the enumeration process, which also assigns bus numbers. In such embodiments, one type of decoder in each PCI-to-PCI bridge may be used for routing between devices based on their identifiers, and a separate decoder within each PCI-to-PCI bridge may determine the address of a message or request, and may know how to route the message or request to another PCI-to-PCI bridge (i.e., the PCI-to-PCI bridge associated with the recipient) based on that address.

In some embodiments of the systems described herein (including, for example, in a system that includes the PCIe hierarchy illustrated in FIG. 3), data and interrupt traffic flow may take place between the endpoint devices and the root complex. For example, the endpoint devices (including shared I/O endpoint 326) and the root complex 304 may communicate with each other through switch 302.

In some embodiments, the endpoint devices in a PCIe hierarchy may be processing nodes that collectively executed distributed applications in a distributed processing node system. In other words, in some embodiments, a PCIe hierarchy may be used as the fabric to connect together a large number of nodes in a distributed system. In these and other large and/or distributed systems, there may be one host (root complex) associated with a large number of endpoint devices in the same hierarchy. The node acting as the root complex may include all of the hardware necessary to perform the functions of an endpoint device or the root complex, in some embodiments. In some embodiments, all of the nodes in the PCIe hierarchy may include all of the hardware necessary to perform the functions of an endpoint device or the root complex, and may be software programmable to enable the functionality of an endpoint device or the root complex in conjunction with the corresponding switch port assignment of primary and secondary ports. In other embodiments, different ones of the nodes may explicitly be configured (e.g., in hardware) to function as either the root complex or an endpoint device in the hierarchy. In some embodiments, each of the endpoints may be given a task (e.g., a portion of a distributed application, such as a calculation to be performed, or another type of task) and may return a response. The node that is configured (or programmed) to act as the root complex may or may not perform calculations or tasks that are part of an executing application, but may be responsible for setting up the hierarchy, performing an enumeration, and/or performing other initialization operations for the PCIe hierarchy.

FIG. 4A is a block diagram illustrating one embodiment of an error message filtering device 400 according to some embodiments. An example filtering device 140 as described herein may include a memory 420. Firmware 430 resides within the memory 420. In some example systems, a version of the CE containment layer/modules described herein is implemented within firmware 430. Monitoring parameters 440 also reside within memory 420. As described herein, monitoring parameters may be received from an operating system of the root node, calculated by the CE containment layer, or retrieved from a storage.

One or more filtering registers 450 may also reside within memory 420 according to some embodiments. Filtering registers 450 according to some embodiments may be hardware registers corresponding to one or more devices within a switched fabric hierarchy. Alternatively or in combination, filtering registers 450 may be implemented wholly or partially within an endpoint node or device, and/or wholly or partially within the root complex. An example filtering register is shown and described herein with reference to FIG. 4B.

Memory 420 according to some embodiments may be connected via bus 460 to one or more I/O devices 470 and one or more processors 480. An I/O device 470 is configured to receive and transmit data to and from filtering device 140. For example, I/O device 470 may communicate with network switch 302 and/or root complex 304 of FIG. 3. Processor 480 according to some embodiments includes a cache 485 and is configured to execute instructions contained in memory 420, including, in some embodiments, code stored within firmware 430.

FIG. 4B is a table representing a filter register according to some embodiments. For example the register of 4B may represent a portion of an example filtering register 450 of FIG. 4A. The first illustrated row of filter register 490 represents bits 00-15 of the register, a field called "RID Filter". In some embodiments, the CE containment module, upon receiving commands and parameters from the root complex OS, writes an RID of an offending device into "RID Filter". When CE message filtering is activated, CE messages associated with this RID will not be transmitted to the root complex OS (or written to a message-handling FIFO logic).

In some embodiments, a single bit (bit 16 of example register 490) is labeled "RID Filter Start". Setting the value of this bit to 1 (high/on) starts filtering of CE messages associated with the RID written into the "RID Filter" field. While this bit is set high, a separate RID Filter Catch bit (not shown here) is set to 1 if a CE message is received from the device whose RID is in the "RID Filter" field. Clearing "RID Filter Start" disables filtering.

The RID Filter Catch bit, according to some embodiments, may reside within an interrupt status register. The RID Filter Catch bit may be queried by the CE containment layer or other element of a filtering device in order to facilitate tracking of CE error messages from an offending device while the offending devices CE error messages are being filtered/masked from the root complex OS.

Figure 5:
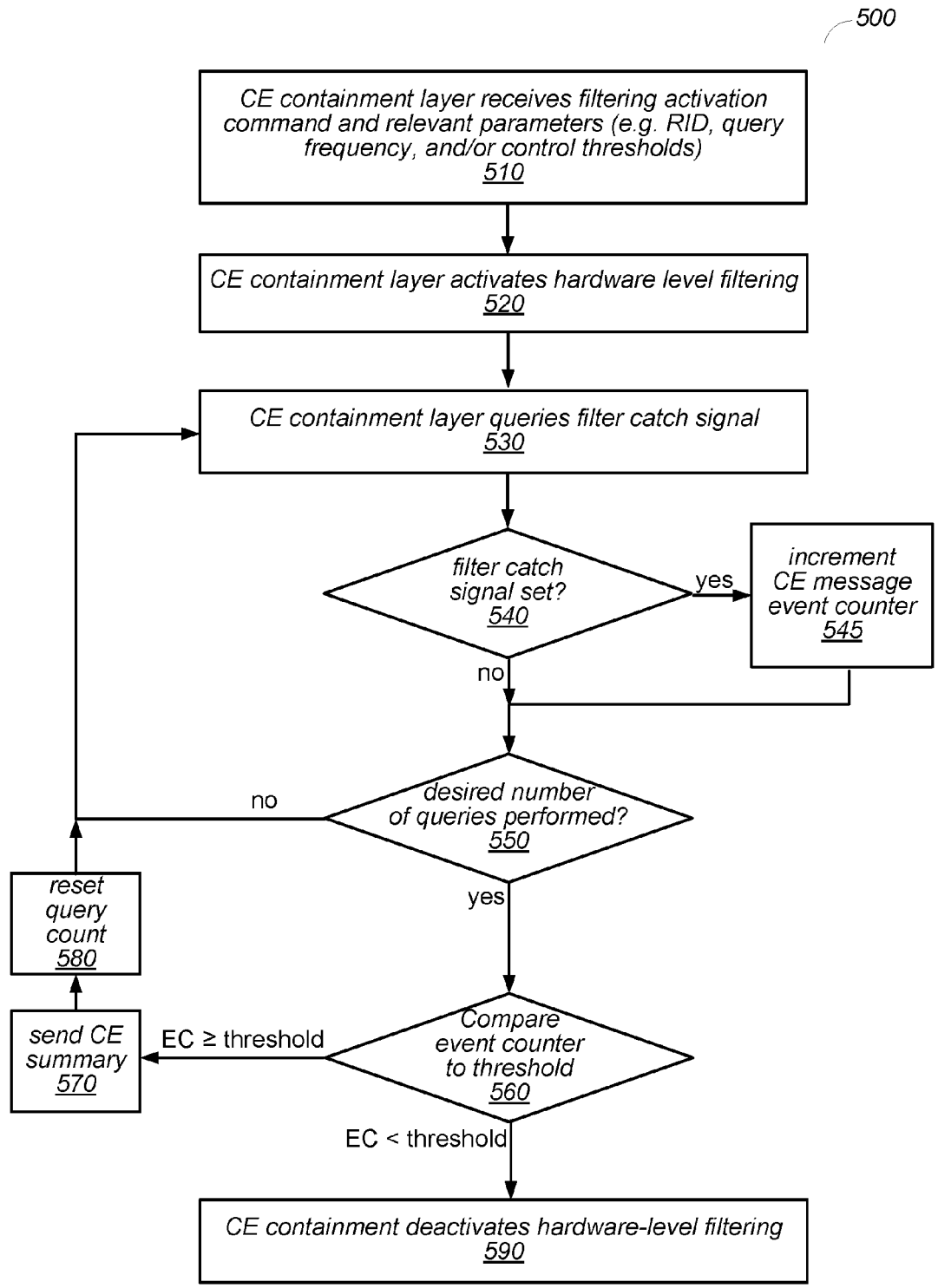
FIG. 5 is a flow diagram illustrating one embodiment of a method for implementing CE message filtering using a correctable error containment layer or module.
Figure 6:
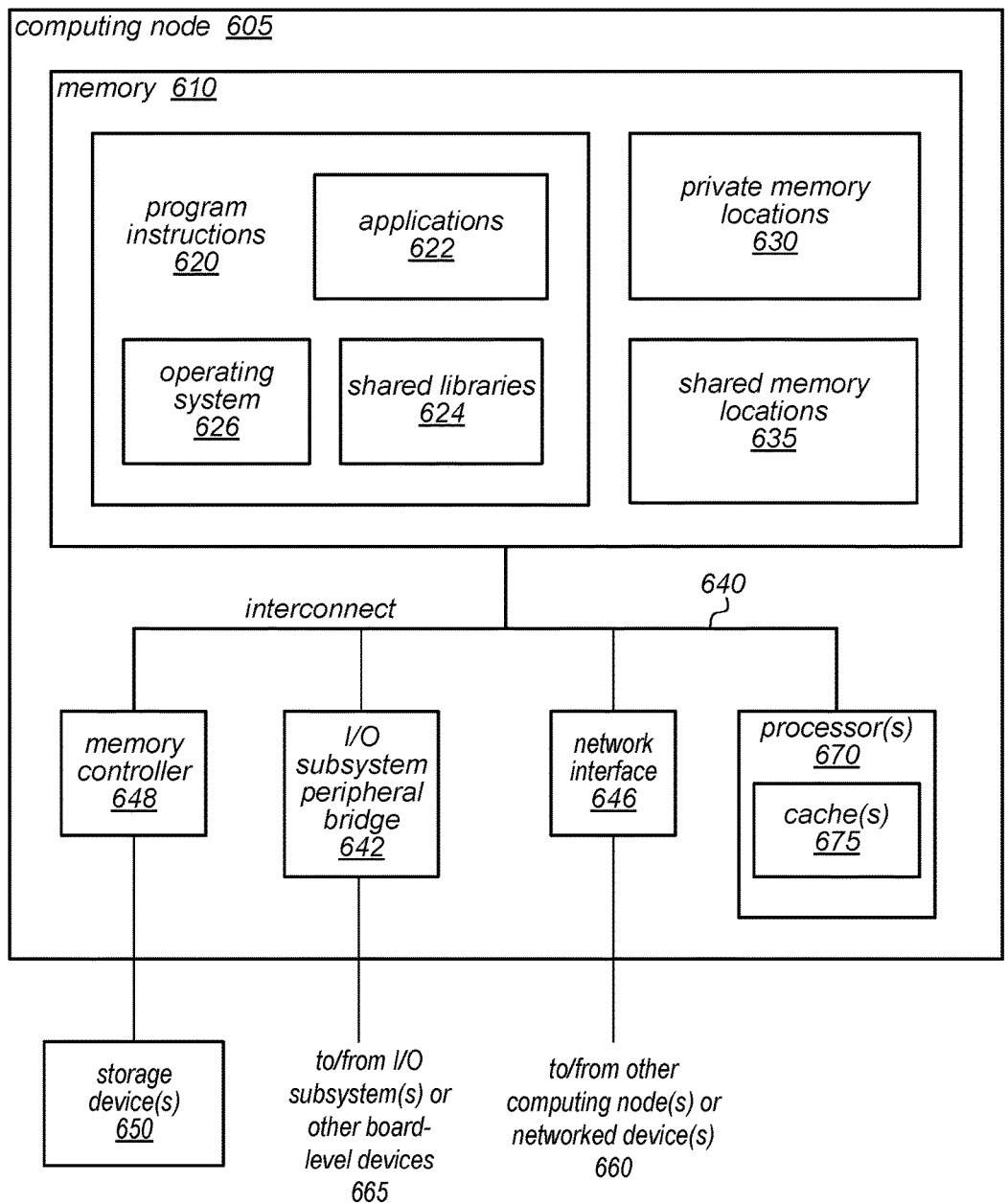
FIG. 6 illustrates a computing node that is configured to implement at least some of the methods described herein, according to various embodiments.

FIG. 5 is a flow diagram illustrating one embodiment of a method for implementing CE message filtering using a correctable error containment layer or module. At step 510 of process 500, the CE containment layer receives a filtering activation command as described herein. The CE containment layer may also receive additional information such as the RID of the device to be filtered, a query frequency, or other threshold or control parameters relevant to the filtering. The CE containment layer may receive these control and/or query parameters simultaneously or otherwise associated with the filtering activation command from the root complex OS. In some embodiments, as described herein, the CE containment layer may calculate one or more necessary filtering or querying parameters, or read one or more of such parameters from a remote or local storage.

At step 520 of process 500, the CE containment layer implements filtering. In some embodiments, this filtering is implemented at a hardware level. For example, in some embodiments, the CE containment layer may write the RID of an offending device to be filtered into a register identical or similar to the "RID Filter" field of FIG. 4B. The CE containment layer may then set a parameter identical or similar to the "RID Filter Start" bit of FIG. 4B to activate filtering. One of ordinary skill in the art will appreciate that the specific details of hardware-level filtering implementation are system-dependent and may be adjusted accordingly to the exact hardware configured within a switched fabric hierarchy. In other embodiments, the filtering may be implemented completely or partially by software or firmware.

At step 530 in some embodiments, the CE containment layer queries a filter catch signal. As described elsewhere herein, a filter catch signal may be set high when a CE message is generated by an offending device while messages from the offending device are being filtered. A filter catch signal according to some embodiments may reside within an interrupt register.

At step 540 of according to some embodiments, the CE containment layer at step 540 determines during a query whether the filter catch signal is set high. According to some embodiments, the CE containment layer may implement a local or remote CE message event counter, which is incremented at step 545 when the filter catch signal is queried and found to be set high. In some embodiments, step 540 or 545 further includes resetting the filter catch signal after incrementing the CE message event counter.

According to at least some embodiments, at step 550, the CE containment layer determines whether it has queried the CE filter catch signal a desired number of times. As described elsewhere herein, a desired number of queries may be received from the root complex OS or calculated by the CE containment layer. In some embodiments, step 550 includes, alternatively or in addition to a desired query number, other thresholds such as, for example, a time threshold. For example, step 550 may include determining whether filtering and/or querying has occurred a threshold minimum amount of time.

According to some embodiments, when filtering has timed out or a desired number of queries has been performed, the CE containment layer may at step 560 compare the CE message event counter to a threshold. For example, in some embodiments the root complex OS may supply instructions that filtering should be turned off when the CE message event counter is below a certain threshold after a particular number of queries and/or a particular period of filtering time.

If conditions for deactivating filtering have not been met at step 560, the CE containment layer in some embodiments may, at step 570, send a CE summary to the root complex operating system. A CE summary according to some embodiments can include information about CE messages generated during filtering. For example, the summary may include a count of CE messages (e.g. the value of the CE message event counter) and/or it may include additional details such as information identifying specific types of CE errors reported.

At step 580, the CE containment layer may in some embodiments reset various parameters before returning to step 530 to continue its querying. For example, the CE containment layer may reset its query count and/or the CE message event counter, or modify other parameters as necessary in order to facilitate filtering and querying.

If certain conditions have been met at step 560, the CE containment layer may deactivate filtering of the offending device at step 590. For example, the CE containment layer may reverse its activation procedures or send a command to a hardware controller to cease filtering. In some embodiments, the CE containment layer may deactivate filtering by resetting the "RID Filter Start" bit and/or clearing the "RID Filter" field.

In some embodiments, the techniques described herein for filtering CE messages may be implemented in an aggressive scale-out distributed database architecture that contains many processing nodes (e.g., over a thousand nodes) in a single rack. As previously noted, reliability, availability, and serviceability (RAS) attributes may be critical in systems of this size, and commonly used industry approaches do not scale to meet the needs of a system of this scale. In some embodiments, the systems in which these techniques are implemented may include multiple hierarchies of processing nodes, each containing a single root complex and multiple endpoints.

As previously noted, error management software needs adequate information in order to take appropriate action when a node exhibits any type of error, and the loss of an error message (e.g., should multiple nodes in a hierarchy issue an error at substantially the same time) may be unacceptable for this class of machine. The techniques described herein may provide error management software with better opportunities to determine the underlying faults in the PCIe hierarchy, since a full, more complete record of events may be preserved than in conventional systems. Better RAS decisions may thus be made, which may limit the number of nodes that may need to be taken off-line or restarted in response to those errors. While these techniques are describe herein in terms of systems that have a large number of PCIe nodes and high RAS requirements, they may also be applicable in systems with high broadcast message traffic.

Note that, while several of the examples described herein include ring structures that are configured to store PCIe messages of different types, in other embodiments, other types of data structures may be configured to store these messages. For example, messages may be stored in linear FIFOs, or in more complex data structures (e.g., linked lists). Note also that, while these techniques have been described herein in terms of a PCIe interconnect fabric, in other embodiments, they may be applied in systems that employ a different type of interconnect fabric. For example, they may be applicable in any system that include different classifications of traffic and a mechanism by which errors or other exception types of traffic need to be processed but in which there are limited resources that are allocated in the system architecture for those situations. In various embodiments, they may be implemented in systems in which there is a switched fabric on which multiple devices have the potential to generate large numbers of errors or other types of exception-related traffic.

The techniques described herein for filtering correctable error messages in a switched fabric hierarchy may be applied in any of a variety of system architectures, in different embodiments. In one example, the system may implement a distributed database architecture in which the overall performance is dependent on the interconnect bandwidth between processing nodes. In this example, the system may include a hybrid interconnect fabric consisting of a PCIe fabric and a fabric that is compliant with the InfiniBand™ standard developed by the InfiniBand Trade Association, and one of the endpoints (a shared I/O device) may be a PCIe-to-InfiniBand host channel adaptor. In other embodiments, any system that includes a large number of PCIe endpoint devices may benefit from the techniques described herein.

Example System

FIG. 8 illustrates a computing node 605 that is configured to implement some or all of the methods described herein, according to various embodiments. The computing node 605 may be (or may be a component of) any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device. In some embodiments, computing node 605 may be one of a plurality of computing nodes or other components in a switched fabric hierarchy, as described herein. For example, computing node 605 may represent a shared I/O device, an endpoint node, or a node configured as the root complex for a particular hierarchy of nodes, or may implement some or all of the functionality of a network or fabric switch, in different embodiments.

Some of the functionality for handling various messages in a switched fabric hierarchy (e.g., for handling PCIe messages of various types in a PCIe hierarchy), as described herein, may be provided as (or invoked by) a computer program product, or software, that may include a non-transitory, computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computing node 605 may include one or more processors 670; each may include multiple cores, any of which may be single or multi-threaded. For example, multiple processor cores may be included in a single processor chip (e.g., a single processor 670), and multiple processor chips may be included on a CPU board, two or more of which may be included in computing node 605. In various embodiments, one or more of the processors 670 may be (or include) a special-purpose processor core. Each of the processors 670 may include a cache 675 or a hierarchy of caches, in various embodiments. As illustrated in this example, computing node 605 may include a memory controller 648 and/or a network interface 646 (which may implement an interface according to the PCIe standard or another switched fabric interface, in some embodiments) and may communicate to or from other computing nodes or networked devices (860). Computing node 605 may also include one or more I/O subsystem peripheral bridges 642 (which may include, or may provide an interface to a subsystem that includes, a PCI-to-PCI bridge).

As illustrated in FIG. 8, computing node 605 may also include or have access to one or more persistent storage devices 650 (e.g. optical storage, magnetic storage, hard drive, tape drive, solid state memory, etc., that is external to, but accessible by, computing node 605), and one or more system memories 610 (e.g., one or more of cache, SRAM, DRAM, RDRAM, EDO RAM, DDR 10 RAM, SDRAM, Rambus RAM, EEPROM, etc.). In some embodiments, system memory 610 may store a portion of a data set for an application on which processor(s) 670 may operate locally. For example, memory 610 on computing node 605 may include local storage (e.g., within private memory locations 630 or shared memory locations 635) for data structures, elements of which may be the targets of various functions of an executing application, portions of which execute on computing node 605. In some embodiments, memory 610 may include persistent storage (e.g., for storing firmware or configuration parameter values that are fixed for a given computing node or a given set of configuration registers). In other embodiments, configuration registers or configuration parameters stored in system memory 610 may be programmable (e.g., at runtime). Various embodiments of computing node 605 may include fewer or additional components not illustrated in FIG. 8 (e.g., video cards, audio cards, additional network interfaces, peripheral devices, a network interface such as an ATM interface, an Ethernet interface, a Frame Relay interface, etc.)

In this example, the one or more processors 670, the memory controller 648 (which may provide access to storage devices 650), the I/O subsystem peripheral bridges 642 (which may provide access to an I/O subsystem such as the switched fabric hierarchy illustrated in FIG. 3, and/or to other board-level interconnect-based devices, shown as 665), and the system memory 610 may be coupled to the system interconnect 640. In some embodiments, various ring buffers (or other data structures) that are configured to store messages of different types on behalf of computing node 605 and/or other computing nodes may reside on storage devices 650 or within memory 610. One or more of the system memories 610 may contain program instructions 620. Program instructions 620 may be executable to implement one or more applications 622 (which may include a portion of an executing application that accesses a shared I/O device in order to perform various physical or virtual functions thereof), shared libraries 624, or operating systems 626. In various embodiments, program instructions 620 may be encoded in platform native binary, any interpreted language such as Java™ byte-code, or in any other language such as C/C++, Java™, etc. or in any combination thereof. The program instructions 620 may include functions, operations and/or other processes usable in implementing some of the functionality for handling various messages in a switched fabric hierarchy (e.g., for handling various types of PCIe messages in a PCIe hierarchy), as described herein. Such support and functions may exist in one or more of the shared libraries 624, operating systems 626, or applications 622, in various embodiments. The system memory 610 may further comprise private memory locations 630 and/or shared memory locations 635 where data (including portions of a data set for an application 622 and/or various configuration parameter values) may be stored. For example, private memory locations 630 and/or shared memory locations 635 may store data accessible to concurrently executing threads, processes, or transactions, in various embodiments. In addition, the system memory 610 and/or any of the caches of processor(s) 670 may, at various times, store data that has been fetched (or prefetched) from one of system memories 610 and/or from storage devices 650 by (or on behalf of) an application executing on computing node 605. Note that the system memory 610 and/or any of the caches of processor(s) 670 may, at various times, store any other data usable in implementing the techniques described herein, some of which may include values that are configurable by the programmer or by a user.

Although various embodiments have been described above in considerable detail, numerous variations and modifications will become apparent to those skilled in the art once the above disclosure is fully appreciated. For example, although many of the embodiments are described in terms of particular types of switched fabric networks, shared I/O devices, and/or system architectures, it should be noted that the techniques and mechanisms disclosed herein for filtering correctable error messages within a switched fabric hierarchy may be applicable in other contexts in which there are multiple nodes, and that may benefit from the techniques described herein. It is intended that the following claims be interpreted to embrace all such variations and modifications.

What is claimed is:

1. A system, comprising:
   a computing node configured as a root complex in a switched fabric hierarchy;
   one or more endpoint nodes configured as endpoints in the switched fabric hierarchy;
   a correctable error ("CE") management module configured, at least in part, to:
   receive a plurality of error messages associated with the one or more endpoint nodes;

detect, among the plurality of error messages, a CE storm associated with an offending device, the offending device associated with a first endpoint node of the one or more endpoint nodes; and identify the offending device as a target for CE filtering; and a CE filtering module configured, at least in part, to:

at least in part in response to the error management module's identification of the offending device as a target for CE filtering, prevent transmission to the root complex of at least a portion of the plurality of error messages that are associated with the offending device.

2. The system of claim 1, wherein detecting a CE storm comprises detecting an error event threshold.

3. The system of claim 1, further comprising a CE containment module configured, at least in part, to:

receive a filtering activation command from the CE management module;

receive at least one CE containment instruction from the CE management module; and transmit at least one CE filtering command to the CE filtering module.

4. The system of claim 3, wherein the at least one CE containment instruction comprises at least one of:

a routing identifier ("RID") of the offending device;

an indication of how often the CE containment module should query CE events associated with the offending device; and at least one CE management threshold.

5. The system of claim 3, wherein the at least one CE filtering command comprises at least one of:

an instruction to begin filtering CE messages associated with the offending device;

an instruction to cease filtering CE messages associated with the offending device.

6. The system of claim 3, wherein the CE containment module is further configured to:

monitor a prevalence of CE events associated with the offending device; and when the prevalence of CE events associated with the offending device is lower than a CE event threshold provided by the CE management module, instruct the CE filtering module to cease filtering CE messages associated with the offending device.

7. The system of claim 3, wherein the CE management module is implemented within the root complex.

8. The system of claim 3, wherein the CE containment module is implemented as firmware within the root complex.

9. The system of claim 3, wherein the CE containment module is implemented as firmware within a filtering device separate from the root complex.

10. The system of claim 3, wherein the CE filtering module is implemented as hardware within a filtering device separate from the root complex.

11. The system of claim 3, wherein the CE filtering module is implemented within the offending device.

12. The system of claim 1, wherein detecting a CE storm comprises detecting repetitive error messages from a particular one of the one or more endpoint nodes.

13. A method, comprising:

receiving, by a CE management module, a plurality of error messages associated with the one or more endpoint nodes, wherein the CE management module is associated with a root complex in a switched fabric hierarchy;

detecting, by the CE management module, a CE storm associated with an offending device, wherein the offending device is associated with a first endpoint node of one or more endpoint nodes in a switched fabric hierarchy;

identifying, by the CE management module, the offending device as a target for CE filtering;

filtering, by a CE filtering module, correctable error messages associated with the offending device, the filtering at least in part in response to the error management module's identification of the offending device as a target for CE filtering, wherein the filtering comprises preventing transmission to the root complex of at least a portion of the plurality of error messages that are associated with the offending device.

14. The method of claim 13, further comprising:

by the CE containment module:

receiving a filtering activation command from the CE management module;

receiving at least one CE containment instruction from the CE management module, the CE containment instruction comprising:

an RID of the offending device;

a CE event query frequency; and at least one CE management threshold; and transmitting a begin filtering command to the CE filtering module, wherein the begin filtering command instructs the CE filtering module to begin the filtering of CE messages associated with the offending device.

15. The method of claim 14, further comprising:

by the CE containment module:

determining a number N, where N represents a number of desired iterations for querying a filter catch signal;

querying the filter catch signal associated with the offending device according to the CE event query frequency, the querying occurring at least N times, wherein a CE event counter is incremented in response to receiving an indication, during an iteration of querying of the filter catch signal, that a CE error event has occurred since an immediately previous iteration of querying the filter catch signal;

comparing a value of the CE event counter with the value of a CE event threshold;

when the value of the CE event counter is lower than the value of the CE event threshold, transmitting a stop filtering command to the CE filtering module, wherein the stop filtering command instructs the CE filtering module to cease the filtering CE messages associated with the offending device.

16. The method of claim 15, further comprising:

transmitting, by the CE containment module to the CE management module, a summary of CE events associated with the offending device.

17. The method of claim 15, wherein the CE event threshold is one of the at least one CE management thresholds.

18. An apparatus, comprising:

one or more endpoint devices configured as endpoints in a switched fabric hierarchy;

a computing device configured as a root complex in the switched fabric hierarchy, the computing node comprising:

a root complex processor;

a root complex memory, the root complex memory comprising program instructions that when executed by the root complex processor cause the processor to:
  implement a CE management module configured, at least in part, to:
    receive a plurality of error messages associated with the one or more endpoint nodes;
    detect, among the plurality of error messages, a CE storm associated with an offending device, the offending device being one of the one or more endpoint devices;
    identify the offending device as a target for CE filtering; and
a filtering device comprising:
  a filtering processor;
  a filtering memory, the filtering memory comprising:
    a plurality of filtering registers associated with the one or more endpoint devices;
    firmware instructions that when executed by the filtering processor cause the filtering processor to:
      receive a filtering activation command from the CE management module;
      begin filtering CE messages from the offending device by manipulating a filtering value of an offending device register to begin filtering CE messages from the offending device, wherein the offending device register is one of the plurality of filtering registers that is associated with the offending device.

19. The apparatus of claim 18, wherein the filtering processor is further configured to:
  receive, from the CE management module, a CE event query frequency and a CE event threshold;
  determine a number N, where N represents a number of desired iterations for querying a filter catch signal of the offending device register;
  query the filter catch signal according to the CE event query frequency, the querying occurring at least N times, wherein a CE event counter is incremented in response to receiving an indication, during an iteration of querying of the filter catch signal, that a CE error event has occurred since an immediately previous iteration of querying the filter catch signal;
  compare a value of the CE event counter with the value of the CE event threshold;
  when the value of the CE event counter is lower than the value of the CE event threshold, manipulating the filtering value of the offending device register to cease filtering CE messages from the offending device.

20. The apparatus of claim 18, wherein at least one of the one or more endpoint devices is one of the following:
  a computing device;
  a storage device; or
  a networking device.

* * * * *